US009352230B1

(12) United States Patent
Wilkinson et al.

(10) Patent No.: US 9,352,230 B1
(45) Date of Patent: May 31, 2016

(54) METHOD AND SYSTEM FOR TRACKING MOTION-SENSING DEVICE

(75) Inventors: Dana Wilkinson, Mountain View, CA (US); Charles Musick, Jr., Belmont, CA (US); William Robert Powers, III, San Francisco, CA (US); Youding Zhu, Sunnyvale, CA (US)

(73) Assignee: AiLive Inc., Sunnyvale, CA (US)

( * ) Notice: Subject to any disclaimer, the term of this patent is extended or adjusted under 35 U.S.C. 154(b) by 1259 days.

(21) Appl. No.: 13/105,863

(22) Filed: May 11, 2011

Related U.S. Application Data

(63) Continuation-in-part of application No. 12/835,750, filed on Jul. 14, 2010, now abandoned, which is a continuation-in-part of application No. 12/020,431, filed on Jan. 25, 2008, and a continuation-in-part of application No. 11/486,997, filed on Jul. 14, 2006, now Pat. No. 7,702,608.

(60) Provisional application No. 60/990,898, filed on Nov. 28, 2007.

(51) Int. Cl.
*A63F 9/24* (2006.01)
*A63F 13/00* (2014.01)
*G06F 17/00* (2006.01)
*G06F 19/00* (2011.01)
*A63F 13/428* (2014.01)

(52) U.S. Cl.
CPC ............... *A63F 13/428* (2014.09); *A63F 13/00* (2013.01); *A63F 2300/105* (2013.01); *A63F 2300/6045* (2013.01)

(58) Field of Classification Search
CPC . A63F 2300/6045; A63F 13/10; A63F 13/06; A63F 2300/105; A63F 13/00; A63F 13/428
USPC ....................................................... 463/36, 37
See application file for complete search history.

(56) References Cited

U.S. PATENT DOCUMENTS

| 7,173,604 B2 * | 2/2007 | Marvit ................... G06F 3/017 345/156 |
| 2006/0223635 A1 * | 10/2006 | Rosenberg ....................... 463/37 |
| 2006/0264258 A1 * | 11/2006 | Zalewski et al. ................ 463/36 |

* cited by examiner

*Primary Examiner* — Omkar Deodhar
*Assistant Examiner* — Wei Lee
(74) *Attorney, Agent, or Firm* — Joe Zheng

(57) ABSTRACT

Techniques for interpreting motions of a motion-sensitive device are described to allow natural and intuitive interfaces for controlling an application (e.g. video game). A motion-sensitive device includes inertial and generates sensor signals sufficient to derive positions and orientations of the device in six degrees of freedom. The motion of the device in six degrees of freedom is tracked by analyzing sensor data from the inertial sensors in conjunction with data from a secondary source that may be a camera or a non-inertial sensor. Different techniques are provided to correct or minimize errors in deriving the positions and orientations of the device. These techniques include "stop" detection, back tracking, extrapolation of sensor data beyond the sensor ranges, and using constraints from multi trackable objects in an application being interfaced with the motion-sensitive device.

37 Claims, 12 Drawing Sheets

METHOD AND SYSTEM FOR TRACKING MOTION-SENSING DEVICE

CROSS REFERENCE TO RELATED APPLICATIONS

This is a continuation-in-part of U.S. application Ser. No. 12/835,750, entitled "Method and system for controlling objects within a virtual environment", filed on Jul. 14, 2010 now abandoned, which is a continuation-in-part of co-pending U.S. application Ser. No. 12/020,431 filed on Jan. 25, 2008, entitled "Self-Contained Inertial Navigation System for Interactive Control Using Movable Controllers", which claims the priority of a provisional application Ser. No. 60/990,898, filed Nov. 28, 2007, and is a continuation-in-part of U.S. application Ser. No. 11/486,997, filed Jul. 14, 2006, now U.S. Pat. No. 7,702,608.

BACKGROUND OF THE INVENTION

1. Technical Field

The invention generally relates to the area of human-computer interaction, and more particularly relates to self-contained inertial navigation systems (INS) for interactive control using movable controllers in applications such as video games. With one embodiment of the present invention, inputs from a hand-held controller containing inertial sensors allow a user to control an object within a two or three dimensional representation shown to the user, and allow the user to directly manipulate one or more chosen objects by mapping the positions of the controller in a physical world to corresponding positions in a virtual world. Various embodiments of the present invention may be used in computer applications, video games, or on-screen controls for electronic devices.

2. Related Art

There are a number of man-machine interface devices, such as computer mice, joysticks, remote controllers and trackballs, for controlling computer applications and video games. Each of these devices are well understood in the art and primarily focus on converting motions of a human being into an analog motion that is represented on a two dimensional screen. For example, a joystick translates the position of the control stick relative to a center into a velocity that is applied to a point located on a two dimension screen. According to an established convention, a left-right motion of the control stick corresponds to left-right motion on the screen and a forward-away motion of the control stick corresponds to up-down motion on the screen.

This basic approach of remapping inputs to control motions has been extended to cover three-dimensional computer applications using objects such as 3D mice and 3D joysticks. One approach of doing this is described in U.S. Pat. No. 5,898,421. Most of these approaches available today, however, have the disadvantage that the users must learn an artificial convention for how their motions in the physical world correspond to the motions of a pointer in a computer representation. In general, users prefer natural interactions with a computer application.

A natural interaction for a user would be to have a direct control over the motion of an object in a displayed scene. For example, in a sword-fighting game, a natural control for the user would be to have the sword displayed in the game with the same orientation and position as the motion controller in his/her hand. Currently this is possible by having an external system that measures the exact position and/or orientation of the controller in the physical world. A system for doing this is described in U.S. Pat. No. 4,862,152 but requires the addition of bulky sonic sensors and emitters in the vicinity of the user. Essentially, the system is limited by restricting the motions of the user within a predefined range.

Another natural interaction a user desires is the ability to directly point at objects by using his/her hand to point at the image being shown on the display. A two-dimensional solution to this particular style of interaction is introduced by Nintendo in the Wii system (US Patent Publication No.: US20070060384), however it requires additional modification of the environment of the user by adding a sensor bar to define a limited range and field of view, thus restricting the movements of the user to a small range in front of the sensor bar. It would be desirable to have an approach that requires less modification to the user's environment and allows natural three-dimensional pointing interactions.

There is thus a need for techniques to track effectively a controller(s) when the controller(s) is being manipulated in a physical space in reacting to a virtual space being displayed. Such techniques provide a full control on motions of displayed objects in six degrees of freedom. Such techniques shall work in situations in which there are no additional sensors or emitters around the physical space. When there are additional sensors or emitters around the physical space, such techniques are provided to utilize the external sensing data to track the controller with minimize errors.

SUMMARY OF INVENTION

This section summarizes some aspects of the present invention and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Generally speaking, the present invention describes techniques for interpreting user motions of a motion controller in order to allow natural and intuitive interfaces for controlling a computer application or video game. According to one aspect of the present invention, a motion-sensitive device, also referred to as a motion controller or simply controller herein, held by a user contains inertial and/or non-inertial sensors and generates sensor signals sufficient to derive positions and orientations of the controller in six degrees of freedom. The motion of the controller in six degrees of freedom is tracked by analyzing sensor data from the inertial sensors in conjunction with video images, if available, from one or more cameras installed in the vicinity of the controller and configured to monitor the camera(s). The detected motion in absolute positions and orientations for the controller may be then used for fine control of one or more objects rendered on a display shown to the user.

According to another aspect of the invention, the camera may carry a mark that can be readily detected in images or image data from a camera monitoring the motion of the controller. Thus consecutive points in a two-dimensional space from the image data are located, where the consecutive points in the two-dimensional space correspond to the consecutive points in a three-dimensional space detected from the sensor data. The detection of a difference in yaw between the two-dimensional space and the three-dimensional space helps estimate a depth of each of the consecutive points in the two-dimensional space, resulting in a set of consecutive points in a three-dimensional space determined by the camera. As a result, a new set of consecutive points can be synthesized to incorporate much less error than the consecutive points in the three-dimensional space, and the consecutive points in the two-dimensional space originally obtained individually.

According to still another aspect of the invention, one embodiment is provided to capture early and small movement of a motion-sensitive device, where the early and small movement is retroactively fit into a movement of the motion-sensitive device being detected to generate a complete tracking of the motion-sensitive device.

In general, the motion of a motion-sensitive device is a collection of short-term moves. It is desirable to extend a maximum possible length of each move by either reducing the error built up in the short-term or improving the ability to automatically recover from the error in between moves. A number of techniques, such as stop detection, back tracking, extrapolation outside sensor ranges, and combining constraints from multiple trackable objects, are employed to improve such short-term tracking with self-contained inertial sensors.

The present invention may be implemented in different forms, including an apparatus, a method or a part of a system. According to one embodiment, the present invention is a method for determining tracking a motion-sensing device in six degrees of freedom, the method comprises: receiving sensor data sequentially from inertial sensors in the motion-sensing device; estimating three relative angular and three relative translational motions of the motion-sensing device from the sensor data; and correcting the three relative angular and three relative translational motions of the motion-sensing device to derive a relative motion path of the motion-sensing device. The motion-sensing device is usually equipped with a wireless transceiver to communicate with a computing device (e.g., a console). The computing device includes a corresponding transceiver to receive sensor data from the motion-sensing device, a memory space (e.g., random access memory (RAM), non-transitory readable medium), a processor and a computing unit configured to perform desirable functions as described herein.

According to another embodiment, the present invention is a method for determining tracking a motion-sensing device in six degrees of freedom, the method comprises: receiving a first set of sensor data sequentially from inertial sensors in the motion-sensing device and a second set of sensor data from at least one non-inertial sensor, wherein the first set of sensor data is sufficient to derive orientations and positions of the motion-sensing device in six degrees of freedom; estimating three relative angular and three relative translational motions of the motion-sensing device from the first set of sensor data; and deriving an absolute motion of the motion-sensing device from the three relative angular and three relative translational motion and the second set of sensor data. In one case, the motion-sensing device is being used by a user in an area to interact with an application, there is a source generating a sensible field in the area, and the non-inertial sensor in the motion-sensing device is a sensor to detect the sensible field to indicate an orientation of the motion-sensing device when the motion-sensing device is caused to move around in the field.

According to still another embodiment, the present invention is a method for determining tracking a motion-sensing device in six degrees of freedom, the method comprises: receiving a first set of sensor data sequentially from inertial sensors in the motion-sensing device, wherein the first set of sensor data is sufficient to derive orientations and positions of the motion-sensing device in six degrees of freedom; estimating three relative angular and three relative translational motions of the motion-sensing device from the first set of sensor data; obtaining additional information about at least one of six axes required for tracking the motion-sensing device in absolute values in a three-dimensional space; and deriving an absolute motion of the motion-sensing device from the three relative angular and three relative translational motion and the additional information, wherein the additional information is used as at least a known parameter in deriving the absolute motion of the motion-sensing device. As an example, the additional information can be obtained from a dead-reckoning technique based on a camera, where positions along two axes can be estimated, thus only motions for the remaining four axes need to be derived.

According to yet another embodiment, the present invention is a computing device for determining tracking a motion-sensing device in six degrees of freedom, the computing device comprises: a transceiver receiving sensor data sequentially from inertial sensors in the motion-sensing device; a memory space; a processor coupled to the memory space; and a data processing unit, coupled to the memory space and controlled by the processor, configured to perform operations of: estimating three relative angular and three relative translational motions of the motion-sensing device from the sensor data; and correcting the three relative angular and three relative translational motions of the motion-sensing device to derive a relative motion path of the motion-sensing device.

Other objects, features, benefits and advantages, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
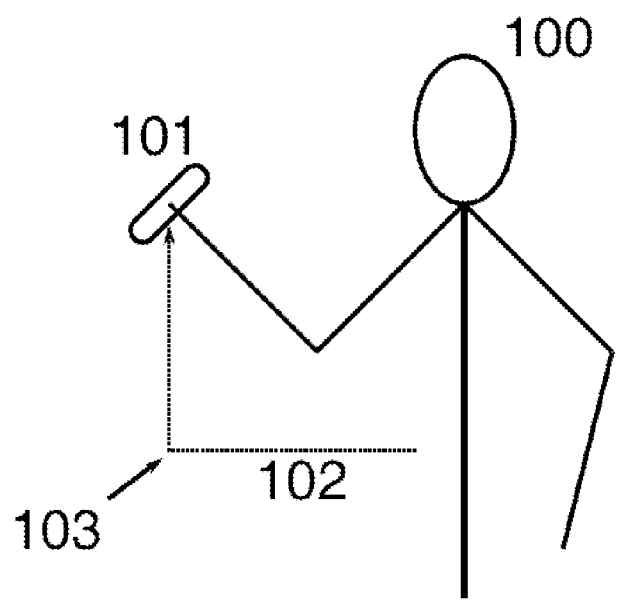
FIG. 1 shows a user holding a motion controller that is used to make a gesture by holding the controller to move along an L-shaped path as part of his/her interaction with an application.

Referring now to the drawings, in which like numerals refer to like parts throughout the several views. FIG. 1 shows a user 100 holding a motion controller 101. The user has made a gesture by holding the controller 101 to move along an L-shaped path 102 as part of his/her interaction with an application (e.g., a video game or remote control of moving parts). At a particular point in the path 103, the user had made a distinct change in the direction of motion, resulting in two sub-motions via a "stop". As will be explained below, one of aspects of the present invention is to detect such a stop, namely detecting a point where a motion is made an abrupt direction change.

Figure 2:
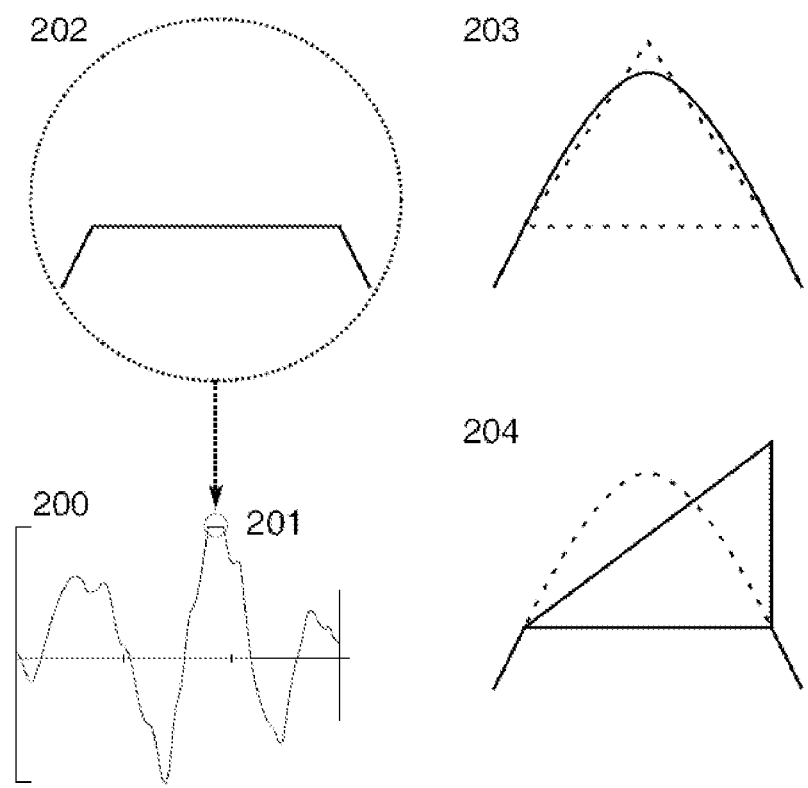
FIG. 2 shows a typical graph of a data stream from an accelerometer (i.e., an INS sensor) that may be enclosed in a controller of FIG. 1.

FIG. 2 shows a typical graph of a data stream 200 from an accelerometer (i.e., an INS sensor) that may be enclosed in a controller of FIG. 1. The graph 200 is represented in time-series data, namely samples versus time. A portion 201 of the graph 200 is highlighted to show that the sensor is maxed out. It may be the case that an end user using a motion controller may accelerate the controller beyond the limits of the sensor signals from the sensor(s) in the controller. An enlarged version 202 of the portion 201 is provided to show the detail of the portion 201. A possible extrapolation 203 of what the sensor samples would be is also shown, if the sensor had a greater range 203. As will be explained below, another one of aspects of the present invention is to use an approximation technique to derive the values in the range of maxed-out (provided the sensor had a greater dynamic range). In one embodiment, a linear approximation of the extrapolation 203 may have very different values but would be integrated to roughly the same values 204.

Figure 3A:
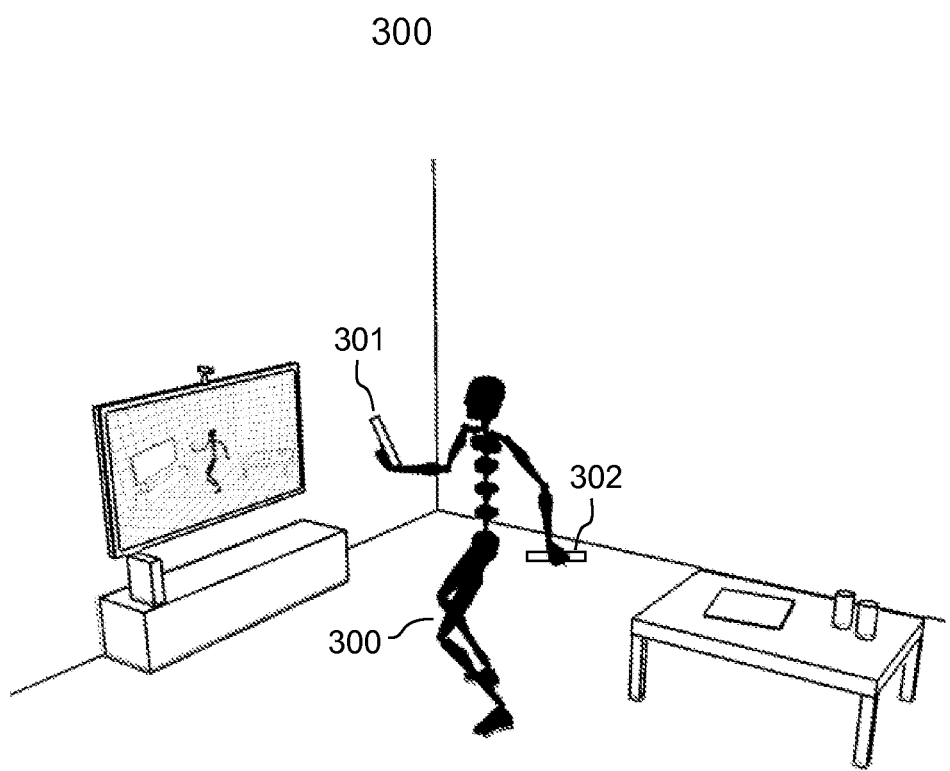
FIG. 3A shows a user simultaneously using two motion controllers to interact with an application, where the two motion controllers may be held respectively by two different users.
Figure 3B:
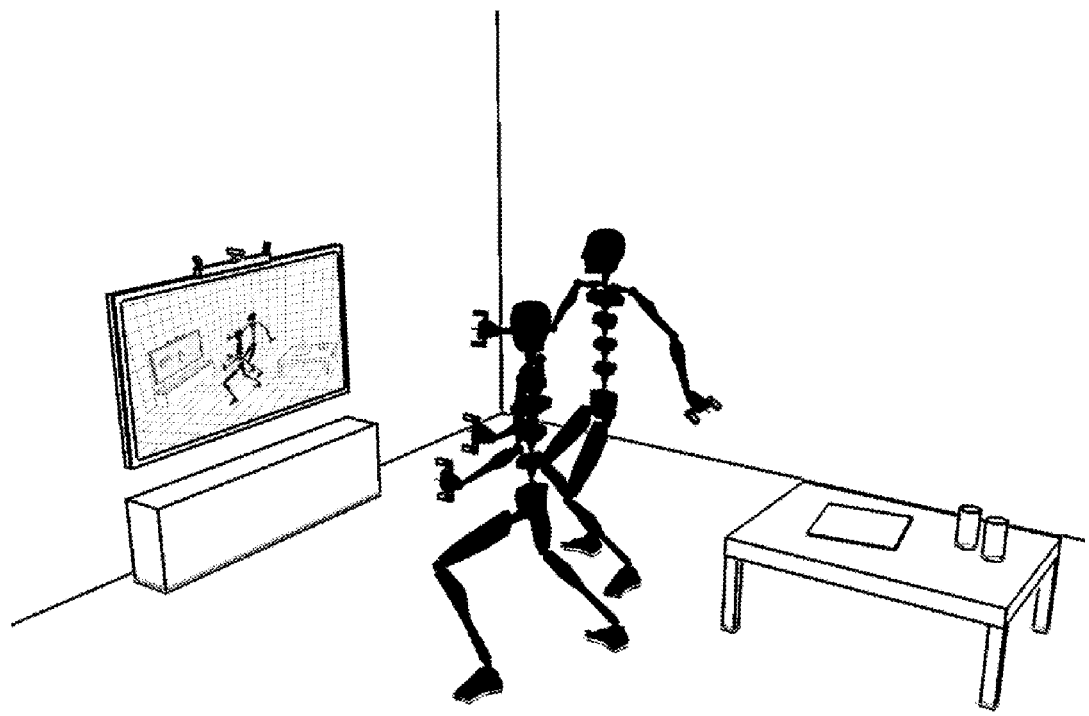
FIG. 3B shows two users each using two motion controllers to interact with an application being displayed.

FIG. 3A shows a user 300 simultaneously using two motion controllers 301 and 302 to interact with an application, where the two motion controllers 301 and 302 may be held respectively by two different users. FIG. 3B shows two users each using two motion controllers to interact with an application being displayed. As will be explained below, still another one of aspects of the present invention is to use different constraints (e.g., a bounding box, yaw orientation between two frames of reference or which hand is holding which controller) to track respective movements of multiple controllers.

Figure 3C:
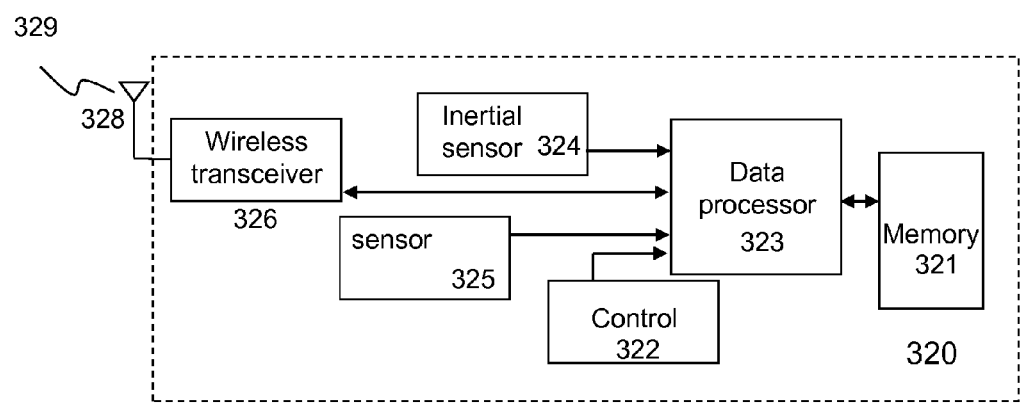
FIG. 3C shows a block diagram of an exemplary motion controller.

FIG. 3C shows a functional diagram of an exemplary motion controller 320. It includes a memory space 321, a computing unit (or control) 322, a processor 323, a set of inertial sensors 324, and a wireless transceiver 326. The inertial sensors 324 generates sensor data to be transmitted a base unit (not shown) via the transceiver 326. A module implementing one embodiment of the present invention is stored in the memory space 321 and executed by the processor 323 to cause the computing unit (or control) 322 to perform desired functions as described herein. In another embodiment of the exemplary motion controller 320, it also includes one or more non-inertial sensor 325. As will be further described below, the non-inertial sensor 325 generates additional data that can be used to facilitate determination of an absolute tracking of the motion controller 320 in six degrees of freedom.

Figure 4:
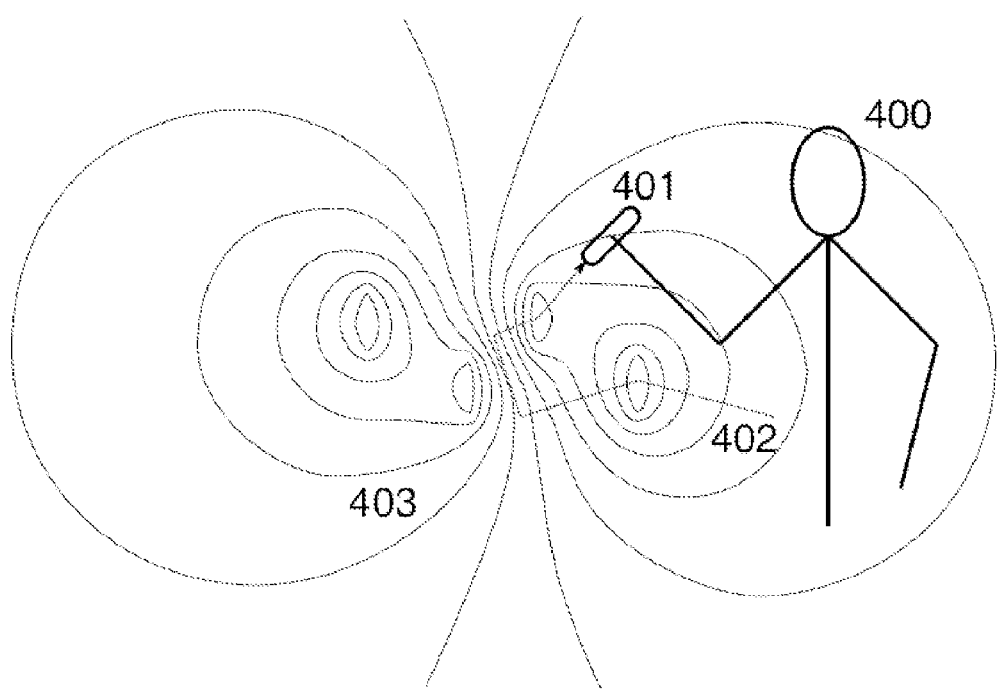
FIG. 4 shows a user using a motion controller to make a gesture or path through a magnetic field generated by a source near the user while interacting with an application.

FIG. 4 shows a user 400 using a motion controller 401 to make a gesture or path 402 through a magnetic field 403 generated by a source near the user while interacting with an application. One aspect of the present invention is to differentiate between two tracking systems, one that does not have memory of the local environment; and another one that does have memory of the local environment. As will be explained below, a local map may be built using the magnetic field 403 to facilitate the tracking of small motions of a controller.

Figure 5A:
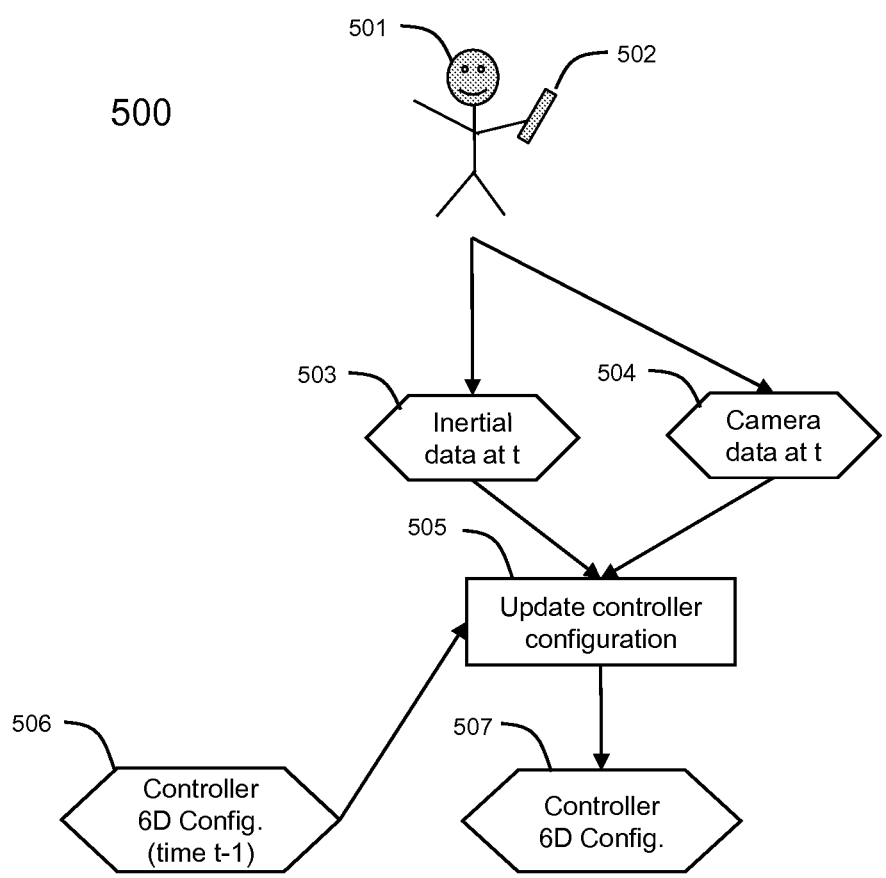
FIG. 5A shows a functional block diagram of a tracking unit or a tracker, and how the tracker tracks the position and orientation of a motion controller held by a user, according to one embodiment of the present invention.

FIG. 5A shows a functional block diagram 500 of a tracking unit or a tracker, and how the tracker tracks the position and orientation of a motion controller 502 held by a user 501, according to one embodiment of the present invention. The motions of the controller 502 are reported by inertial data 503 from the inertial sensors therein and images 504 from one or more cameras disposed in front of or in the vicinity of the user. For example, an action field is allocated in front of a display. The user 501 moves the controller 502 in the action field. The controller 503 is communicating wirelessly with a base unit (not shown) via Bluetooth, radio frequency or the Internet. As the user manipulates the controller 502, the controller 503 sends out the inertial data 503, meanwhile images containing the motions of the controller are produced by one or more cameras installed around the action field. As will be further described below, the images are provided to facilitate the determination of the motion of the controller 502.

What FIG. 5A shows is that the motion is often determined from a previous time. For example, the motion of the controller at a moment T is determined from the motion of the controller at a moment T−1. To minimize errors in determining position and orientation of the controller 502, the images 504 are analyzed. According to one embodiment, the controller 502 is labeled with one or more marks or tags that can be readily detected in the images 504 to track the movements of the controller 502. In another embodiment, the images 504 are from a pair of stereo cameras. In any case, the output of the tracker is the position and orientation of the controller 502 in six degrees of freedom.

Figure 5B:
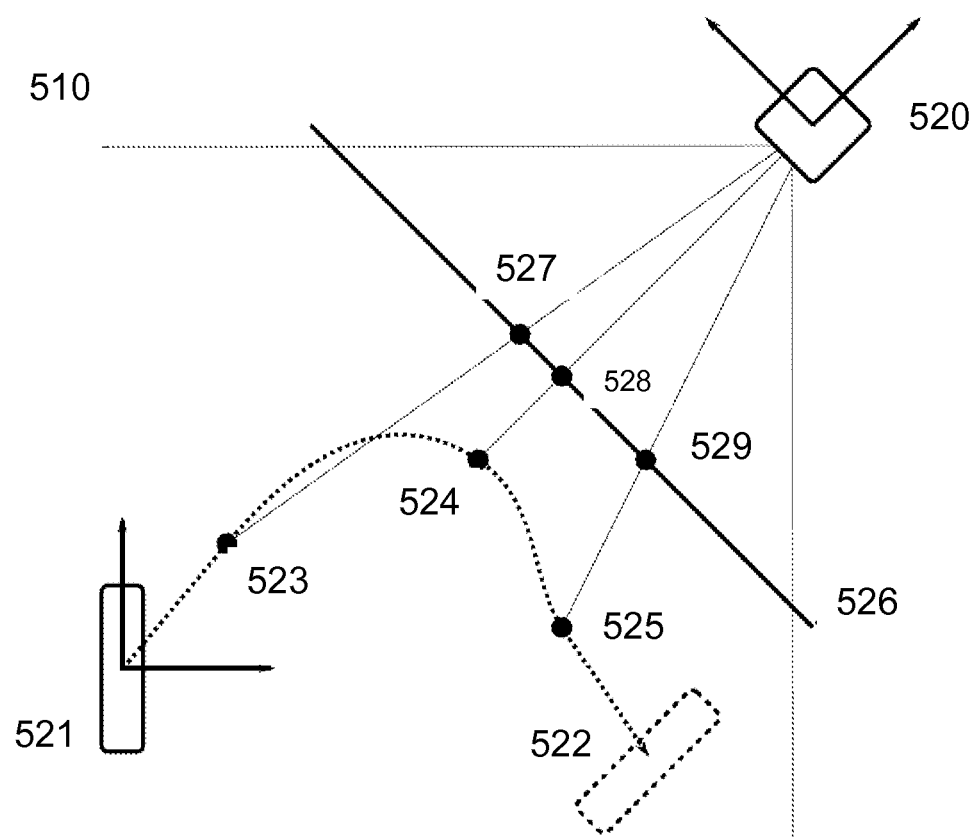
FIG. 5B is a top-down view of a motion controller and an exemplary path it may take during interaction with an application.

FIG. 5B is a top-down view 510 of a motion controller 521 and an exemplary path 522 it may take during interaction with an application. There are 3 example points 523, 524 and 525 on the path 522. Also shown are a camera 520 with a corresponding image plane 526 with 3 points 527, 528 and 529 respectively corresponding to the 3 points 523, 524 and 525 from the motion path 522. As will be further detailed below, the coordinates of the points 523, 524 and 525 in the frame of reference of the motion controller (501) can be derived with a confined setting.

Figure 6:
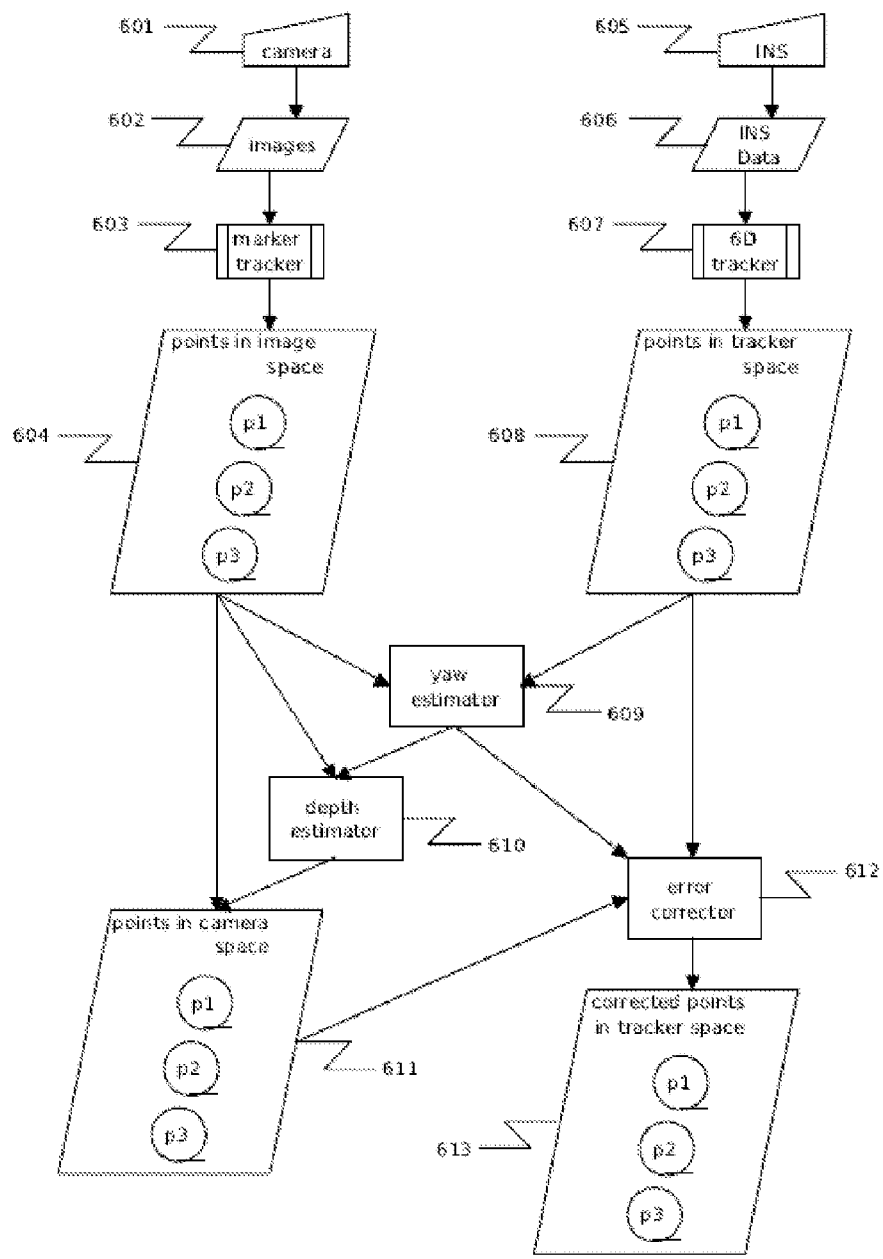
FIG. 6 shows an embodiment of the current invention, where a motion controller containing inertial sensors generates inertial sensor data over time.

FIG. 6 shows an embodiment of the current invention, where a motion controller containing inertial sensors 605 generates inertial sensor data 606 over time. Additionally a camera 601 generates a sequence of images 602 over time. The sensor data 606 is processed by a tracker 607 as described previously, resulting in a set of consecutive points or positions 608 in a 3 dimensional space defined by the tracker 607. The image data 602 is processed by a module (e.g., a software module stored in memory and executed by a processor) capable of locating markers in the image data 602, resulting in a set of consecutive points 604 in the 2 dimensional image plane of the camera with some known correspondences to the tracker points 608. As an example, the difference in yaw between the tracker space and the image plane can be determined at 609, which will be further described in Section 3 below. Once this yaw is determined, it is possible to estimate the depth of each of the 2 dimensional points from the camera at 610, resulting in a set of consecutive points 611 in a 3 dimensional space determined by the camera, which will be further described in Section 3 below. The points in the tracker space 608, the points in camera space 611 and the angle between them 609 can be synthesized 612 to produce a new set of consecutive points 613 that incorporates much less error than the original sets of points 608 and 611. This is described in more detail in Section 3.1 below.

Figure 7A:
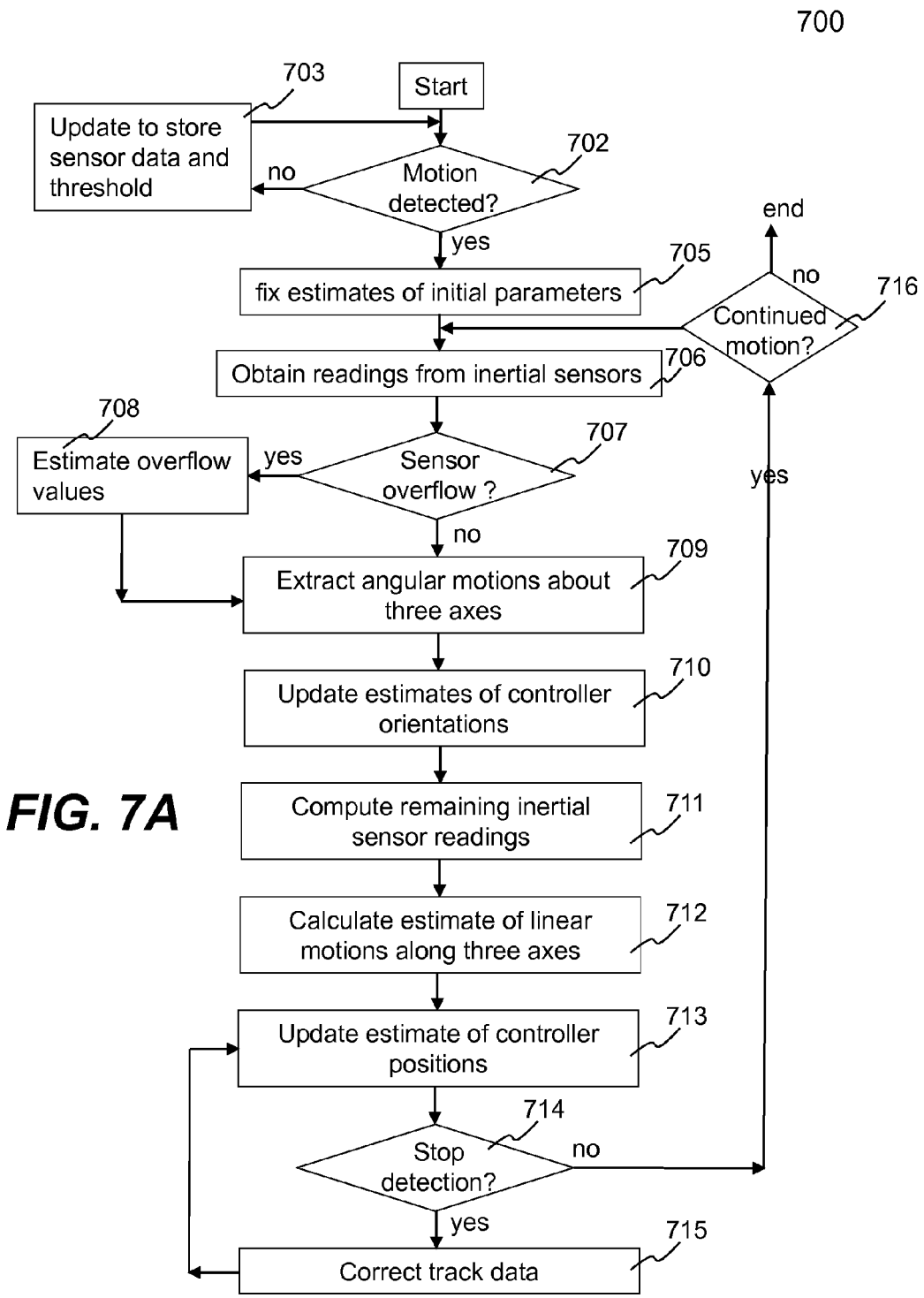
FIG. 7A is a generalized flowchart or process of determining a motion of a controller in six degrees of freedom according to one embodiment of the present invention.

FIG. 7A is a generalized flowchart or process 700 of determining a motion of a controller in six degrees of freedom according to one embodiment of the present invention. To facilitate the understanding of the process 700, a game controller is assumed to be interacting with a video game (e.g., provided by a game console or from the Internet). Depending on implementation, the process 700 may be implemented in software, hardware or a combination of both.

To facilitate the description of the process 700, some detailed operations are deferred to subsequent sections for details when deemed necessary. The process 700 starts at 701. An initial determination is made to check if a user has started to move a controller (e.g., changing from a stationary status) at 702. If the determination is "No", then the sensor data receive may be still stored for later correction (e.g., changing a threshold to detect the movement of the controller). If the initial determination of motion is "Yes", then the readings from all the sensors in the controller are obtained via wired means or wireless means.

Figure 7B:
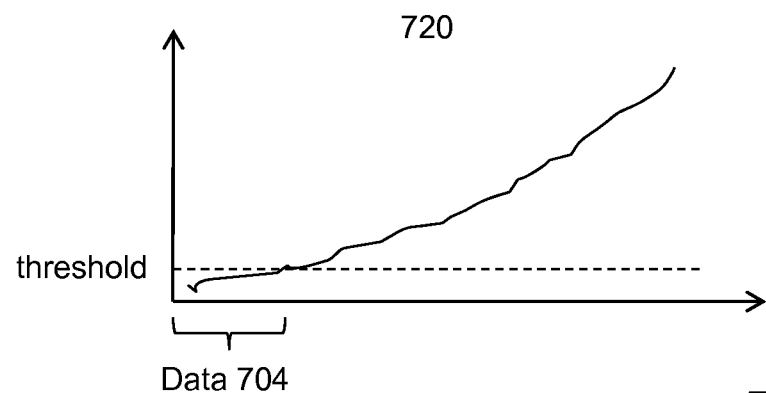
FIG. 7B illustrates a motion of a controller that is gradually moved in magnitude.

It is assumed that the determination is "No", the process 700 goes to 703 to collect what is being received from the controller. In one embodiment, because the motion being made by the controller is small, the controller is initially considered to be stationary. In one embodiment, the process 700 may lower a threshold with which the process 700 is configured to detect if the controller has been moved. The newly updated threshold is then stored or updated till a motion of the controller is detected or the controller is being manipulated by the user. As shown in FIG. 7A, the block 704 indicates the data that needs to be stored to recover a complete motion when necessary. The data includes the received sensor data before a movement is detected. FIG. 7B illustrates a motion of a controller that is gradually moved in magnitude. When a user starts to move a controller, the beginning part of the motion may be under a threshold. The motion is fully detected when the motion exceeds the threshold. To completely model the motion, the beginning part needs to be added back to the detected motion. One aspect of the present invention is to fully track a motion of a controller even if a portion of the motion is not generally detected.

As described below, the newly updated threshold and the collected sensor data (for the motion below the threshold) or other data at 704 will be used to estimate initial motion or parameters of the controller at 705. In practice, the exact choice of a threshold or associated parameters for the threshold relies both on the characteristics of the inertial sensors and the kinds of motions typically made by a user.

Once the determination of motion is "Yes" at 702, the process 700 goes to 706 via 705, where the initial parameters of the controller are retrieved. In one embodiment, the sensor values are transmitted wirelessly from the controller to a base computing device, such as a game console or a computer. The sensor values are sampled at a predefined high frequency appropriate to the game being played. The sensor data from the sensor readings is obtained at 706.

At 707, the process 700 checks if any of the sensors have maxed out or overflowed, and if they have more appropriate values to be estimated at 708 which will be further described below in Section 3.3. At 709, the angular motion is extracted from the sensor readings. Depending on a particular configuration of sensors in the controller, there are different ways to extract the angular motion of the controller. For example, if three gyroscopes are used in the controller, then the gyroscopes will provide readings of an angular velocity which can be integrated once to obtain the relative angular motion, namely the changes in all three orientations. If accelerometers are used instead, then the readings will provide angular acceleration which can be integrated twice to obtain the relative angular motion.

In general, the gyroscopes could be used for some angular axes and the accelerometers for others, in which case the estimation of the angular motion at 709 can be designed accordingly to perform the appropriate action of integrating once for readings from gyroscopes and twice for readings from accelerometers. The changes in orientations calculated at 709 are then used at 710 to update the previous orientation estimate by adding the changes in the orientations just happened. The sensor readings not used in calculating the angular motion are then extracted from the sensor readings data. Typically, the remaining sensor readings are from accelerometers and the estimate of the angular motion from 709 can be factored out of the accelerometer readings to leave the accelerations due to linear motion along all three linear axes, i.e. the changes in positions at 711. Then the positions of the controller can be updated at 713 using the estimated change in positions calculated at 712. At this point, the angular and translational motions have been estimated.

At 714, a "stop" detection is applied, namely the motion is judged to determine if it has changed substantially (e.g., moving from a "stop"). If so, the motion just detected needs to be modified at 715 which is further described in Section 3.1 below. As the controller continues to be moved, a determination is made as to whether the movement is being continued at 716. If yes, the process 700 is returned to 706, and the tracking of the controller is continued. If not, a further determination is made as to whether the game or application is over at 717. If yes, the process 700 exits. If not, the process 700 is branched back to 702 to wait for a next movement of the controller.

Figure 8:
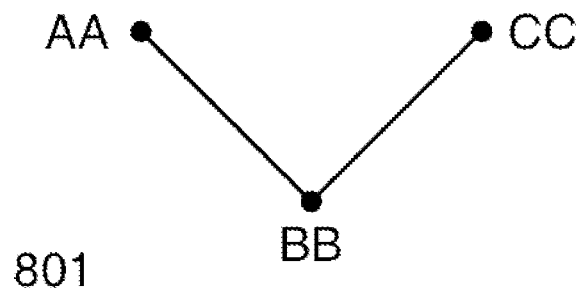
FIG. 8 shows two diagrams, where a first diagram indicates three points (AA, BB, CC) in a tracker space and a second diagram indicates the corresponding three points (A, B, C) in a camera space as well as the projections of two of the points onto an image plane (pA, pC)
Figure 8:
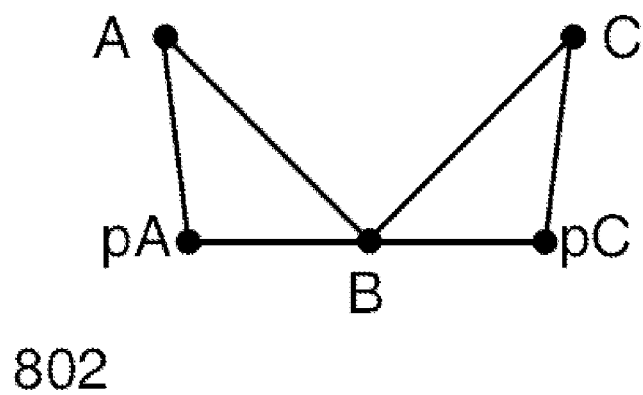

FIG. 8 shows two diagrams 801 and 802, where the diagram 801 indicates three points (AA, BB, CC) in a tracker space and the diagram 802 indicates the corresponding three points (A, B, C) in a camera space as well as the projections of two of the points onto an image plane (pA, pC). The description of projecting points onto an image plane will be detailed below.

Figure 9:
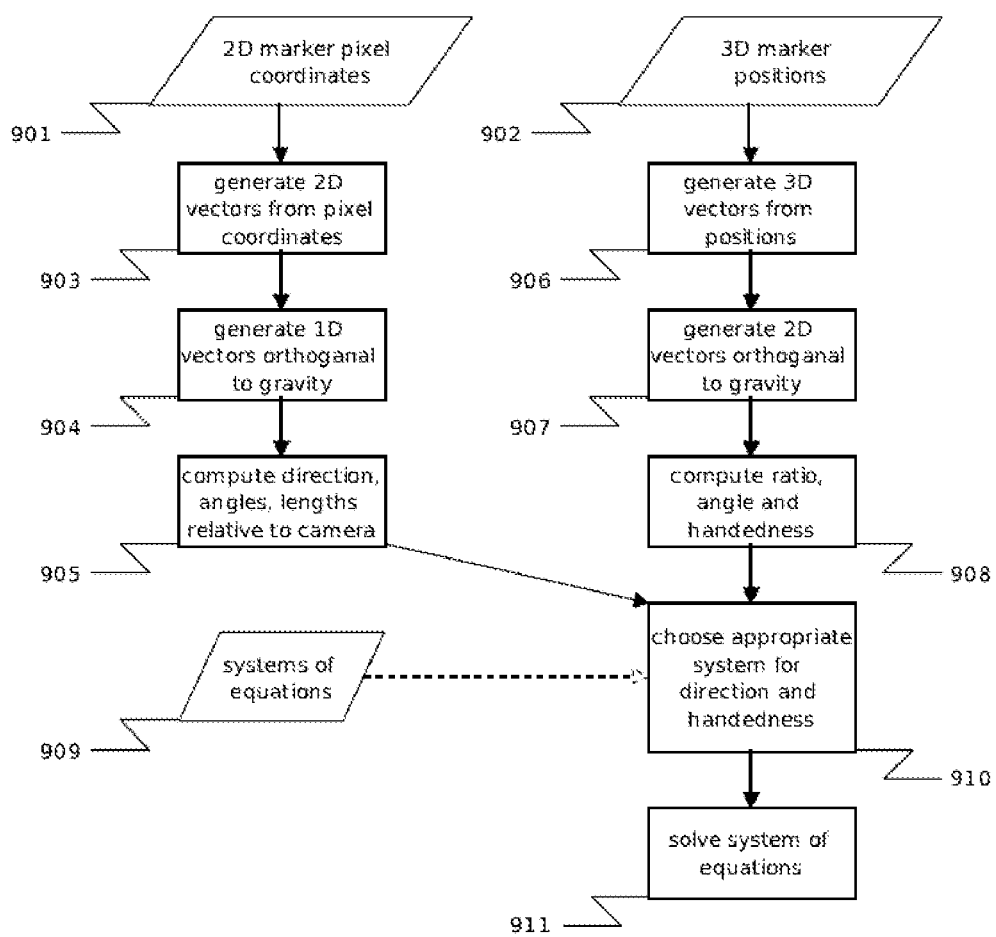
FIG. 9 is a flowchart or process for estimating yaw that may be used for yaw estimation in FIG. 6.

FIG. 9 is a flowchart or process 900 for estimating yaw that may be used for yaw estimation 609 of FIG. 6. It is assumed that three consecutive positions in an image of some marker 901 and three corresponding consecutive positions of that marker in a 3 dimensional inertial space 902 are already obtained.

At 903, at least two dimensional vectors on the image are generated, one from the first pixel to the second pixel, and another from the second pixel to the third pixel. Next, these vectors are assumed to be projected onto a line in the image plane orthogonal to the gravity at 904. Finally the direction of those vectors in the image (left to right), the lengths of the vectors as well as the angles of the pixels corresponding to the endpoints of the vectors are computed at 905. These angles may easily be computed with minimal knowledge of the camera parameters. In parallel to the above computations, at least two dimensional vectors in the inertial space can be generated at 906, one from the first point to the second, another from the second to the third. Next, these vectors are projected onto a plane in the inertial space orthogonal to the gravity at 907. Finally, the ratio of the lengths of the two vectors, the angle between the two vectors and the handedness are computed at 908. The handedness of the vectors is based on whether the second vector points to the left of the first vector or the right (when viewed from above) and is easily computed via the cross product of the vectors.

Depending on the direction of the vectors on the image plane and the handedness of the inertial vectors selected at 910, a set of equations from a set of possible systems can be set at 909. All the equations at 909 have variables that can be determined, for example, the pixel angles and lengths are computed in 905 and the ratio and angle can be computed in 908. Solving the appropriate equations at 911 gives the difference in yaw between the image plane (and therefore the camera space) and the inertial space. It may be noted that only the yaw is unknown, the other two angles, pitch and roll, can be determined by the gravity which is the same for both camera and inertial space. The set of equations at 909 is often very similar from case to case, usually either the same or differing only by a multiplicative constant (e.g., +1 or −1), due to symmetry or periodicity of trigonometric functions (e.g., sin(a)=sin(180−a)). More details on the equations at 909 and their solution obtained at 911 are provided in Section 3.1 below.

Generally speaking, the present invention provides a variety of techniques for improving the 6-D tracking (3-D position and 3-D orientation) of a movable controller. The following description is presented in sections, each with a title to facilitate the understanding of various embodiments of the invention. It shall be understood that the processes, sequences or steps and features discussed the sections are related to each other and each is believed independently novel in the art. The disclosed processes and sequences may be performed alone or in any combination to provide a novel and unobvious system or a portion of a system. It should be understood that the processes and sequences in combination yield an equally independently novel combination as well, even if combined in their broadest sense; i.e. with less than the specific manner in which each of the processes or sequences has been reduced to practice in the description herein.

1 Correcting Self-Contained Tracking State

1.1 Stop Detection

There are some possible motions that an end user could make are inherently composed of sub-motions. For instance, the motion path 102 in FIG. 1 is composed of two distinct parts, the first part being the motion from the start to the point where there is an abrupt direction change 103 and the second part being the motion after the direction change until the end of the motion. The "stop" is defined to be a point in the motion where a user stops one sub-motion and begins another. Stop detection is considered herein a process of detecting a point where a motion is made an abrupt direction change.

It should be noted that the stop detection is different from what is known as quiescence detection. The quiescence detection does not detect stops but instead detects whether or not a motion controller has been relatively still for a certain period of time. The quiescence detection requires "enough time", for instance, for the orientation of the motion controller to be correctable from the accelerometer readings. Unlike the quiescence detection, the stop detection does not have a requirement that the controller be motionless for any particular length of time.

In one embodiment, the stop detection is a particularly important part of tracking the motion of a controller in interactive settings. Human beings are generally more sensitive to state transitions (e.g. from stop to move or from move to stop) than to continuous changes (e.g., increases/decreases in speed or smooth changes in direction). As described previously, many tracking techniques are subject to accumulating errors in velocity. A reliance on the quiescence detection may result in noticeable delays between when a user completes a motion and when the tracking reports a stop since the typical acceleration readings will continue to oscillate for a period after the user perceives a stop in his own motion, both because of the nature of the sensors and natural oscillations in the muscles of the user.

The quiescence detection may not be able to pick up some extremely brief stops that have occurred during transitions between sub-motions in many natural motions (e.g. drawing polygonal shapes or characters in an alphabet). At least three embodiments for detecting stops in typical human motions are designed and described herein. The choice of which of these embodiments is appropriate for a given application and the exact choice of parameters for thresholds will rely both on the characteristics of the inertial sensors and the kinds of motions typically made by a user.

In these embodiments, readings and calculated values for a window of time preceding the current sample will be compared. For clarity, time j is always used to represent the current time of the latest readings, and time i will represent the start of the window of interest. The function angle(v1,v2) is used to represent the angle between two vectors v1 and v2, dot(v1,v2) is used for the dot product between two vectors v1 and v2, and |v1| represents the norm of vector v1. The expression acc_x and vel_x represent the acceleration and velocity respectively at time x, and err(v1) represents a function of the assumed possible error on quantity v1 and is dependent on analysis of the intrinsic errors in the readings from the inertial sensors. U.S. application Ser. No. 12/020,431, commonly assigned, describes an exemplary approach of calculating such an error estimate, which is hereby incorporated by reference.

Embodiment 1

Acceleration reversal report a stop if the following conditions all hold at time j:

a) there exists a time $k$ between $i$ and $j$, where angle $(acc\_k, vel\_i) > theta$ and $abs(dot(acc\_k, vel\_i)) > threshold\_1$;

b) $dot(acc\_j, vel\_i) > 0$; and c) $|vel\_j| < err(v\_j)$.

Embodiment 2

Velocity reversal reports a stop if the following conditions all hold at time j:

a) there exists a time $k$ between $i$ and $j$, where angle $(acc\_k, vel\_i) > theta$ and $abs(dot(acc\_k, vel\_i)) > threshold\_1$; and b) $angle(vel\_j, vel\_i) > theta$ c) $|v\_j| < |v\_i|$.

In one particular application, values for the parameters in the two embodiments above are 135 degrees for theta and 2.0 m/s2 for threshold_1 with a period of about ¼ second between i and j.

Embodiment 3

Velocity inflection reports a stop if the following conditions all hold at time j:

a) $|v\_i| > threshold\_2$;

b) For all periods $k$ between $i$ and $j$, $angle(acc\_j, v\_i) > theta$; and c) $|v\_j| < k*|v\_i|$.

d) $|v\_j| < err(v\_j)$.

In one exemplary application, values for the parameters in the embodiment 3 above were 120 degrees for theta, and 1.0 m/s/s for threshold_2 and k=0.4. It shall be noted that the embodiment 3 is inappropriate for some kinds of motions where the velocity shows an inflection but only one component in fact goes to zero. For example, a user draws the letter v, the vertical component of the velocity goes to zero at the bottom of the v, but velocity in the horizontal direction should persist after the inflection point. Additional precautions must be taken when using this embodiment to identify and handle these cases.

For embodiment 2 and 3, it is also important to not immediately report a new motion starting after the stop if the data could instead be explained by the typical oscillation in the accelerometer readings after a stop. In order to handle this case, the tracker may be configured to continue to report a stop as long as the current accelerations were roughly in line with the initial velocity at v_i and the jerk, calculated as the derivative of the accelerations, was negative.

It is advantageous in practice to forgo looking for stops in some periods, both to save on computation and to avoid situations in which detecting the stop would be of little value. In particular, it is implemented not to look for stops in the period immediately following a previously reported stop, or in time periods with high acceleration readings.

1.2 Back Tracking

Typically, before an end user moves a motion controller in a particular motion, the user holds the motion controller stationary. In general, it is not possible for the user to hold a controller completely still, the controller may be moving in tiny amounts according to how much the hand, arm, torso, or body of the user shakes. Often applications do not require the tracking of these small motions, in fact many applications would prefer to only track intentional motions of the end user. Consequently, rather than constantly tracking this essentially random motion of the controller, actual tracking does not start until the motion controller moves with a certain specified amount of force. Until the motion of the controller goes over a threshold, the position of the controller is not updated.

One potential issue with this is that when an end user starts a motion, the very beginning of that motion (the part under the force threshold) will not be included by the tracking. This means that the resulting track will not quite reflect the actual motion by the user. The longer the portion of the motion under the force threshold is, the more prominent the effect becomes, for example, if an end user starts a motion in a very gentle or slow manner.

In one embodiment of the back tracking solution, a recent history of all movements of the controller is kept before tracking begins. Once the end user moves the controller with enough force to initiate tracking, this history is examined and all movements in the history that are consistent with the initial direction of the tracking and recent enough in time are selected. The selected movements are used as follows: a) they are retroactively included in the initial moments of tracking b) they are retroactively removed from the quiescence detection.

For example, if an end user starts moving in a direction and goes over the force threshold, the tracker examines the history of pre-tracking movements, identifies those whose directions are deemed sufficiently similar to that direction and retroactively "moves" them from the quiescence detector to the beginning of the tracked motion. This results in an overall estimation of motion closer to the actual.

In another embodiment of the back tracking solution, the movements from the history are smoothed before removal from the quiescence detector or addition to the motion tracker in order to reduce the effects of noise.

1.3 Extrapolation Outside Sensor Ranges

The physical nature of the inertial sensors in a motion controller is such that any sensor has minimum and maximum limits. For instance, a given accelerometer may give readings along a particular axis from −2 gravities to +2 gravities, another may give readings in a range from −10 gravities to +10 gravities. It may be the case that an end user using a motion controller may accelerate the controller beyond those limits. For instance, there may be periods of time where an end user using a motion controller with accelerometers with effective range from −2 to +2 gravities accelerates the motion controller more than 3 gravities along a particular axis.

As shown in FIG. 2, the graph 200 is some readings from an exemplary accelerometer (in gravities) over time from such a sensor. Reference 201 highlights a portion of the graph where the sensor readings are maxed out. Reference 202 shows an expanded view of that portion of the graph. It would clearly be a mistake to use the repeated maximum values from the sensor as input to the tracker since it is much more likely that the actual accelerations in that range are greater.

In one embodiment, a parabolic function, such as that shown in 203, is assumed to be a reasonable extrapolation and approximation of the actual accelerations in that range. If the tracking starts after the fact that this would be sufficient, the original data with extrapolations provided as necessary when the sensor reading hit their minimum or maximum would be used as inputs to the tracking. However, in most cases tracking is not a batch process, the tracking needs to be updated continuously with little or no lag behind the end users actual motion. The problem with the parabola is that its shape is known only after the sensor readings become lower than the maximum (i.e., after the range where the sensor is maxed out has passed).

In another embodiment of the invention, the original values of the maxed-out portion of the graph are replaced with a linear function shown as 204 in FIG. 2 whose slope is carefully chosen according to the tangent of the graph at the point where the range begins. If the slope of the linear function is chosen, its integral over the maxed out range is sufficiently close to the integral of the original extrapolation, then the resulting velocities and therefore the resulting positions after the range has passed will be the same.

For instance, it is assumed that the parabola 203 with the triangle is approximated. At the start of the maxed-out range, only the angle (theta) of the bottom left point of the triangle is known (which can be easily derive directly from the tangent of the graph). As discussed above, it would not be effective to model the function over time since the point at which to change from positive to negative slope is unknown (the halfway point of the maxed-out range) until the range has ended. Instead, in one embodiment, a function is modeled based on the triangle 204 of FIG. 2. Since the triangle has the same height and base as the triangle 203, their areas are identical. It only remains to determine the angle (alpha) of the bottom left point of the triangle.

Let x be the length of the maxed-out range (it is unknown yet but it is the same for both triangles). Then the height of the triangle in 203 is: tan(theta)=h/(x/2)–>h=x*tan(theta)/2. This height is the same for the triangle 204, alpha can be derived as follows: tan(alpha)=h/x=x*tan(theta)/2x=tan(theta)/2, and alpha=arctan(tan(theta)/2).

Using this angle alpha, a linear function can be derived and interpreted throughout the maxed-out range and at the end of that range while there may be a discontinuity in the acceleration (which "snaps back" to the maximum value), there should be no discontinuity in the velocity and the position.

In some embodiments instead of just using the tangent of the graph at the beginning of the maxed-out range directly, some function of the tangent may be used together with other information to derive a better triangle or even some other functional form to better approximate the initial extrapolation estimate.

The initial parabola approximation 203 basically assumes a negative constant second derivative of acceleration (or a descending linear first derivative or jerk) throughout the maxed-out range. Other embodiments could use approximations based on different assumptions or the history of the sensor readings or the tracking to date, or other information.

According to another embodiment, information from previous maxed-out ranges is kept. For each period, the tangent at the beginning of the range and the time that the range was maxed out, the tangent at the end of the range and any other appropriate information are kept. This information can be used to determine parameters for a parameterized function to be used as an approximation for a next maxed-out range.

Still in another embodiment, an artificial maximum lower than the actual sensor maximum is set. The behavior of the sensors in any artificially maxed-out ranges that remain below the actual sensor maximum is used to obtain a functional approximation for the sensors during any actual maxed-out ranges. The net result of using this approximation is that the tracking can still be generated even while the sensors are maxed out and while the accelerations of that tracking can not exactly match those of the actual motion, the relative speeds and positions should be the same. This reduces the error in position that would retroactively need to be fixed later.

1.4 Combining Constraints from Multiple Trackable Objects

It is known to improve tracking using different kinds of constraints. For instance, constraints based on knowledge of the kinematics of the human arm or body, or constraints based on application specific knowledge about the kinds of motions an end user is expected to do at a certain point while interacting with an application. In the same vein, there are a variety of similar constraints that can be used to improve tracking when multiple controllers are being tracked simultaneously.

Referring back to FIG. 3A, it shows an end user 300 holding a pair of motion controllers 301 and 302. In one embodiment, very little is known initially about the relationship between the tracks of each motion controller as each has its own frame of reference and the relationship between the two frames of reference. However, knowledge about that relationship can be built up over time. For instance, the estimated bounding box for one controller can be used to better estimate the bounding box for the other controller and vice versa (a bounding box provides invisible boundaries on the track by assuming that a controller will not move beyond a certain distance from where it starts).

In another embodiment, the yaw orientation between the two frames of reference can be estimated over time (note that the other two dimensions of orientation can be determined due to gravity) based on directions of particular paired movements that an end user must perform while interacting with an application. For example, if an application requires both motion controllers to be slashed in the same direction, then we can assume that the directions of the corresponding tracks in each frame of reference each correspond to that single actual direction.)

In another embodiment, additional constraints can be determined if it is known that one of the controllers is in the left hand of the end user and the other is in the right hand of the end user. In still another embodiment, similar constraints can be determined by combining information over time from one or two motion controllers being tracked and some other kind of motion information, such as that from a face tracker or a hand tracker. In yet another embodiment, the information from multiple controllers and possibly a face, body or hand tracker can be combined with a kinematics model to further constrain and improve the tracking of the controller(s) as well as the face, body or hand tracker.

2. Building Local Maps

One aspect of the present invention is to differentiate between tracking systems, one that does not have memory of the local environment, such as motion controllers with accelerometers and gyroscopes; and another one that does have memory of the local environment, such as motion controllers with magnetometers capable of differentiating between the magnetic field potentials of different locations in the environment.

Referring back to FIG. 4, it shows an end user 400 holding a motion controller 401 containing a magnetometer surrounded by a magnetic field 403 which is unique to the surrounding of the end user. At every point in the path 402 of a motion made by the end user, the magnetometer records a different reading of the magnetic field potential. These readings can be stored and associated with the positions of the motion controller in the motion controller's frame of reference. Essentially it is provided a local map of the magnetic field in the end users environment overlaid on the frame of reference of the motion controller.

In one embodiment, an application requires an end user to partake in an initial calibration step during which a local map of the magnetic field potentials is built up as the end user performs a series of carefully designed motions which sufficiently cover the space in which the end user will later make whatever motions are necessary for interaction with the application.

In one embodiment, after the map is built, during tracking of the motion controller the position associated with the closest magnetometer reading to the current magnetometer reading is assumed to be the current position and used to correct the track by backfitting.

In some cases, such a calibration step may be deemed onerous for the user. In one embodiment, the local map is built up over time simultaneously with the interactions by the user with an application.

In still another embodiment, a sensor in the motion controller is a camera and the local map is based on image readings. In yet another embodiment, there is an initial feature extraction step on the images from the camera to mitigate the computational expense of processing raw images.

3. Using Non-Self-Contained Inputs to Correct Self-Contained Tracking State 3.1 Using 2-D Planar Positioning Data to Correct Self-Contained Tracking State According to one embodiment, reasonable 3-D position and orientation estimates of the controller are assumed to have been obtained at three distinct points in a frame of reference relative to the controller (e.g., points 503, 504 and 505 in FIG. 5B). It is also assumed that information about the 2-D positions corresponding to the three points on a plane such as the image plane of a camera tracking some markers on the controller (e.g., via 507, 508 and 509 in FIG. 5B). It is further assumes that the orientation of the controller with respect to gravity and the orientation of the camera with respect to gravity are both known. What is unknown is the distance of the controller from the camera and the yaw orientation of the controller frame of reference to the frame of reference of the camera (or the image plane).

Without loss of generality, it can be assumed that the image plane is as far from the camera as the closest point to the camera (i.e., assume that 524 and 528 in FIG. 5B are the same point). Without confusion, the three distinct points 523, 524 and 525 are collected from a track in a inertial space relative to the initial orientation of the controller, where the points are sufficiently close temporally so that the errors are minimal in their positions and orientations relative to each other.

Referring back to FIG. 8 that may help visualize this, diagram 801 shows another representation of the points 523, 524 and 525 in the inertial space, renamed respectively as AA, BB and CC. The angle(AA, BB, CC) can be easily determined.

These points correspond to 3 points in camera space (relative to a fixed camera). Diagram 802 shows a pictorial representation of these corresponding points called A, B and C. It is assumed that the orientations of both the inertial space and the camera space with respect to gravity are known. The remaining yaw orientation of the inertial space with respect to the camera space is unknown. The position offset between the origins of the inertial space (e.g., corresponding to the center of the controller) and the camera space (e.g., corresponding to the center of the camera) are also unknown.

Distances in inertial space are in cm while distances in camera space are in pixels. Initially it is unknown that how many cm per pixel. But it is known that the ratio of AB to BC must be the same as the ratio of AABB to BBCC and that angle(A, B, C) must be the same as angle(AA, BB, CC). Accordingly, let R=the ratio of AB to BC (=the ratio of AABB to BBCC). Finally, the three corresponding points (527, 528 and 529 in FIG. 5B) on a 2-D image plane are generated by the camera by tracking some marker on the controller. These points pA, pB and pC 802 in FIG. 8, without loss of generality, assume that pB and B are the same point.

For the purposes of illustration, it is assumed that point B is in front of points A and C relative to the camera in the camera space. Variations of one way described below can be determined for all possible cases and the cases can easily be distinguished from each other.

The determination of angle(pA, A, B) or angle(pC, C, B) shall lead to the remaining yaw orientation of the inertial space relative to the camera space. It is assumed that angle(A, pA, B) and angle(C, pC, B) can be determined from knowledge of the viewing frustum of the camera, then:

Since angle(pA, B,pC)=180, and angle(pA, B, A)+angle(A, B, C)+angle(pC, B, C)=180:

$$\text{angle}(pA,B,A)=180-\text{angle}(A,B,C)-\text{angle}(pC,B,C) \quad (1)$$

Since the sum of triangle angles=180, and angle(pC, C, B)=180−angle(C, pC, B)−angle(pC, B, C):

$$\text{angle}(pC,B,C)=180-\text{angle}(C,pC,B)-\text{angle}(pC,C,B) \quad (2)$$

Again, since the sum of triangle angles=180:

$$\text{angle}(pA,A,B)=180-\text{angle}(A,pA,B)-\text{angle}(pA,B,A) \quad (3)$$

Combining equations (1) and (3):

$$\text{angle}(pA,A,B)=180-\text{angle}(A,pA,B)-(180-\text{angle}(A,B,C)-\text{angle}(pC,B,C))$$

$$\text{angle}(pA,A,B)=180-\text{angle}(A,pA,B)-180+\text{angle}(A,B,C)+\text{angle}(pC,B,C)$$

$$\text{angle}(pA,A,B)=-\text{angle}(A,pA,B)+\text{angle}(A,B,C)+\text{angle}(pC,B,C)$$

$$\text{angle}(pA,A,B)=\text{angle}(A,B,C)-\text{angle}(A,pA,B)+\text{angle}(pC,B,C) \quad (4)$$

Combining equations (2) and (4):

$$\text{angle}(pA,A,B)=\text{angle}(A,B,C)-\text{angle}(A,pA,B)+(180-\text{angle}(C,pC,B)-\text{angle}(pC,C,B))$$

$$\text{angle}(pA,A,B)=180+\text{angle}(A,B,C)-\text{angle}(A,pA,B)-\text{angle}(C,pC,B)-\text{angle}(pC,C,B)$$

$$\text{angle}(pA,A,B)=w-\text{angle}(pC,C,B) \quad (5)$$

where w=180+angle(A, B, C)−angle(A, pA, B)−angle(C, pC, B)

By the sine law, length(A, B)/sin(angle(A, pA, B))=length(pA, B)/sin(angle(pA, A, B)):

$$\text{length}(A,B)=\text{length}(pA,B)*\sin(\text{angle}(A,pA,B))/\sin(\text{angle}(pA,A,B)) \quad (6)$$

Also by the sine law, length(B, C)/sin(angle(C, pC, B))=length(pC, B)/sin(angle(C, pC, B)):

$$\text{length}(B,C)=\text{length}(pC,B)*\sin(\text{angle}(C,pC,B))/\sin(\text{angle}(C,pC,B)) \quad (7)$$

Since length(A, B)=R*length(B, C), equations (6) & (7) can be combined as follows:

length(pA,B)*sin(angle(A,pA,B))/sin(angle(pA,A,B))=R*(length(pC,B)*sin(angle(C,pC,B))/sin(angle(C,pC,B))) (5)

u/sin(angle(pA,A,B))=v/sin(angle(pC,C,B)):

sin(angle(pA,A,B))/u=sin(angle(pC,C,B))/v (8)

where:
u=length(pA, B)*sin(angle(A, pA, B))
v=R*length(B, pC)*sin(angle(C, pC, B))

So there are now 2 equations with the two desired angles as the unknowns:

angle(pA,A,B)=w−angle(pC,C,B) (5)

sin(angle(pA,A,B))/u=sin(pC,C,B)/v (8)

Substituting equation (5) into equation (8) gives sin(w−angle(pC, C, B))/u=sin(angle(pC, C, B))/v:

v*sin(w−angle(pC,C,B))=u*sin(angle(pC,C,B)) (9)

Expanding the first sine term in equation (9) gives:

v*sin(w)*cos(angle(pC,C,B))−v*cos(w)*sin(angle(pC,C,B))=u*sin(angle(pC,C,B))

v*sin(w)*cos(angle(pC,C,B))=(u+v*cos(w))*sin(angle(pC,C,B))

sin(angle(pC,C,B))/cos(angle(pC,C,B))=v*sin(w)/(u+v*cos(w))

tan(angle(pC,C,B))=v*sin(w)/(u+v*cos(w)):

angle(pC,C,B)=arctan(v*sin(w)/(u+v*cos(w)))

also:

angle(pA,A,B)=w−angle(pC,C,B).

Either equation (A) or (B) is sufficient to derive the yaw orientation of the inertial space relative to the camera space as desired. Furthermore, it is possible to work out angle(B, pA, A) from the knowledge of the (fixed) viewing frustum (vf) of the camera by deriving the angle of the pixel at pA and subtracting it from 180. The distance of the image plane from the camera in pixels can also be computed as follows:

(width_of image/2)*sin(90−vf/2)/sin(vf/2) (C)

Along with the newly computed angle(pA, A, B), it is now to compute:

length(pA,B)=sin(pA,A,B)*length(A,B)/sin(B,pA,A) (D)

in meters. Since this length in pixels is known, it is possible to determine how many meters each pixel is when the image plane is the same distance from the camera as the closest of A, B and C. Equations (C) and (D) are combined to get the depth of B from the camera in meters (the depth of A and C can then easily be computed).

It shall be noted that any three points along the track can be picked. In one embodiment, the first three points that are in distinctly different positions on the image plane are picked (e.g., points cannot be picked too early in the path shown in the diagram since they would appear to be the same point on the image plane).

In another embodiment, the above technique is applied continuously, taking successive triplets of points that are distinct on the image plane, working out estimates of yaw and depth based on that triplet, and repeating. This allows to maintain overall running estimates of yaw and depth which should, especially over time, be very robust.

3.2 General Model for Correcting Tracking with Some Combination of Limited Position and Orientation Information There are a variety of ways in which additional information about one or more of the 6 axes required for 6-D tracking can be obtained. Some of the exemplary embodiments are listed below.

In one embodiment, a dead-reckoning technique based on a camera is used, where positions along two axes (the x and y position relative to the camera) may be estimated but the other four offsets need to be derived. In another embodiment, a three-dimensional or time-of-flight camera can give dead-reckoning position information along all axes but little orientation information. In still another embodiment, sonar with a single source can give one dimension of dead-reckoning information (the depth from the source) but no others. In yet another embodiment, a source generating a specially patterned magnetic field combined with a corresponding magnetometer in the controller could give orientation information of the controller relative to the source. As similarly shown in FIG. 4, when the controller is in a magnetic field generated from a source, the magnetometer in the controller can detect the orientation of the source so as to indicate the orientation of the controller.

The determination of the missing elements in the 6 dimensions required for tracking is phrased according to an optimization which, when solved, gives an estimated full sample of dead reckoning that can be used to correct a track in the standard manner by back fitting. In another embodiment, in addition to computing a solution of the optimization, a likelihood or "goodness of solution" score is also computed. These scores can be used to increase or decrease the impact of the dead-reckoning samples when back fitting.

In another embodiment, known or unknown error models of the various axes of dead-reckoning information can be used to determine estimates of the accuracy of the dead-reckoning info. These can be used both to affect the method of solving the optimization as well as the likelihood score previously mentioned.

In another embodiment, the dead-reckoning information from the sensors is not in the form of position or orientation, (e.g. it is in the form of velocity or acceleration). This is less useful as the previous error arguments from the Related Art Section will apply since without actual dead-reckoning knowledge about position explicitly it's impossible to correct the position or orientation. Still, such information can be beneficial in correcting the track in the short term.

Note that in all of the above cases the position/orientation information is relative to the marker or external device in the environment. It can be useful to know the orientation of the marker or markers relative to gravity but that's not strictly required.

4. Examples

Various embodiment of the present invention can take many forms from the point of view of an end user. For example, long term motion tracking can be provided as a key part of the control mechanic or interaction mechanism for a game. Two key features benefits and advantages of this invention are that (1) the tracking is self-repairing so the end user needs not do anything or be aware of the need to "fix" tracking as is the case in the prior art; and (2) the tracking has zero latency so what is displayed in the game is a one-to-one match with what the end user is doing in the physical world.

For example, exercise games virtualized from a sport, like basketball, football, soccer, ping pong, tennis, and so on can now be built to simulate the actual real world physics of the motions by a player to a very high degree of precision. Embodiments of the present invention enable games where end users swing motion sensitive devices around wildly without detriment from exceeding the sensing capabilities of the inertial devices. The self-repairing aspect of this invention means error does not continue to accumulate, but instead is corrected at the granularity of a fraction of a second. For example, end users can play an hour of intense ping pong or basketball without pause, and without once being required to recalibrate the sensors at any point in the middle. This has significant value in terms of increasing the sense of immersion by a player in the game being played.

For example, an application of one embodiment of the invention includes exercise applications where a personal fitness coach is a software application running on desktop pc or on video game console. The precise, long-term tracking enabled by one embodiment of this invention means the personal fitness coach application can tell the user exactly how to, for example, swing to hit a golf ball, and exactly where, when and how one is going wrong. The recommended repairs on the golf swing can be visualized along with exactly how and where the golf swing diverged. Golf is just one example of many. For example, a Tai Chi coach, or a TaeKwonDo coach, or a boxing trainer, are all examples of applications that are uniquely enabled by at least one aspect of the current invention.

In one example, medical rehabilitation through applications are made possible to ask a patient to repeatedly perform motions of a specific shape, speed and force, and provide a virtual nurse or physical therapist that is always right there able to tell the patient how well a last motion is conformed to the recommended exercise. One embodiment of the invention is currently targeted at such applications for Cerebral Palsy, and stroke rehabilitation.

In another example, one embodiment of the present invention also enables detection of static poses, and of very specific transitions from one pose to another pose such as one would carry out in a long yoga session. A virtual yogi can provide very precise and accurate advice on how and what to improve in yoga practice.

For games, an interaction mode is a collection of short-term moves (as described above), it is desirable to extend the maximum possible length of each move by either reducing the error built up in the short-term or improving the ability to automatically recover from the error in between moves. A number of techniques as described above improve such short-term tracking with self-contained inertial sensors: stop detection, back tracking, extrapolation outside sensor ranges, and combining constraints from multiple trackable objects.

Some self-contained sensors (such as a magnetometer, sonar or camera) have the ability to differentiate between different absolute positions in the environment. As disclosed herein, two techniques are designed to use such information to improve tracking, one where a model of the environment local to the controller is built up in an initial calibration phase and the other where such a model is built while the position and orientation of the controller is being tracked.

For even more robust longer term tracking, one can make use of data from non-self-contained sensors (e.g., fixed camera, markers on controller), camera on controller, fixed markers in environment. Some of the embodiments as described herein are for improving tracking with self-contained sensors by incorporating information from non-self-contained sensors.

In this case that there is an assumption that either the non-self-contained sensors are insufficient for tracking the controller themselves (because they operate at too low a frame rate or there is too much error in their tracking, e.g., from a lower resolution camera); or the non-self-contained sensors are sufficient for tracking but it is undesirable to rely on that tracking (because of computational or power cost, e.g., on a battery-powered hand-held device); or the non-self contained sensors are sometimes sufficient for tracking but there are periods of time where they are not (because of environmental conditions, e.g., lighting conditions or occlusion when using a camera).

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for determining tracking a motion-sensing device in six degrees of freedom, the method comprising:
   receiving sensor data sequentially from inertial sensors in the motion-sensing device;
   estimating three relative angular and three relative translational motions of the motion-sensing device from the sensor data; and
   correcting the three relative angular and three relative translational motions of the motion-sensing device to derive a relative motion path of the motion-sensing device, wherein said correcting the relative three angular and three translational motions of the motion-sensing device comprises:
      detecting when any of the sensor data has been maxed out because of the motion-sensing device being moved beyond limits of the inertial sensors;
      estimating overflow values for a portion of the sensor data that has been maxed out; and
      replacing the portion of the sensor data that has been maxed out with the overflow values.

2. The method as recited in claim 1, further comprising:
   detecting when the motion-sensing device has been moved with reference to a threshold; and
   adjusting the threshold to lower a predefined sensitivity so that a movement of the motion-sensing device is detectable.

3. The method as recited in claim 2, further comprising updating parameters to be used to estimate the three relative angular and relative translational motions of the motion-sensing device when the movement of the motion-sensing device is detected, the parameters including a portion of the sensor data and the adjusted threshold.

4. The method as recited in claim 1, further comprising:
   maintaining a recent history of all movements of the motion-sensing device;
   initiating to track the motion-sensing device when a motion of the motion-sensing device is detected exceeding a threshold; and
   including retroactively a part of the history in an initial moment of tracking the motion-sensing device; or removing retroactively a part of the history from quiescence of the motion-sensing device being detected.

5. The method as recited in claim 1, further comprising:
storing a beginning portion of the sensor data when a motion from the beginning portion of the sensor data is not detected in reference to a threshold; and
fitting the beginning portion of the sensor data retroactively to a remaining portion of the sensor data after a motion from the remaining portion of the sensor data is detected in reference to the threshold.

6. The method as recited in claim 1, wherein said estimating overflow values for a portion of the sensor data that has been maxed out comprises:
determining a function that is closely represents a portion of the sensor data has been not maxed out; and
extrapolating the overflow values from the function.

7. The method as recited in claim 6, wherein said correcting the relative three angular and three translational motions of the motion-sensing device comprises extrapolating new values that correspond to the portion of the sensor data that has been maxed out to make the inertial sensors in the motion-sensing device to have a greater dynamic range.

8. The method as recited in claim 1, wherein said correcting the three relative angular and three relative translational motions of the motion-sensing device comprises:
detecting a stop, where an abrupt direction changes in a movement in the sensor data; and
concatenating two motions before and after the stop to recover the movement of the motion-sensing device.

9. The method as recited in claim 1, further comprising:
receiving signals from a secondary source monitoring the motion-sensing device when the sensor data is produced from the motion-sensing device,
determining coordinates of the three relative angular and three relative translational motions of the motion-sensing device with the signals from the secondary source; and
determining three absolute angular and three absolute translational motions of the motion-sensing device to derive a complete motion tracking of the motion-sensing device.

10. The method as recited in claim 9, wherein the secondary source is at least one camera, and the signals are image data, and said determining coordinates of the three relative angular and three relative translational motions comprises:
determining consecutive points in a three-dimensional space representing the three relative angular motions and three relative translational motions of the motion-sensing device; and
determining consecutive points in a two-dimensional space from the image data, these consecutive points in the two-dimensional space corresponding to the consecutive points in the three-dimensional space.

11. The method as recited in claim 10, further comprising:
determining a difference in yaw between the three-dimensional space and the two-dimensional space; and
estimating a depth of each of the consecutive points in the two-dimensional space, resulting in a set of consecutive points in a three-dimensional space determined by the camera.

12. The method as recited in claim 11, further comprising:
synthesizing a new set of consecutive points that incorporate much less error than the consecutive points in the three-dimensional space, and the consecutive points in the two-dimensional space.

13. The method as recited in claim 9, wherein one part of the sensor data is from inertial sensors in the motion-sensing device, and the secondary source generates a local sensible field, another part of the sensor data is from a non-inertial sensor in the motion-sensing device to sense the local sensible field to facilitate determination of the three relative angular and three relative translational motions of the motion-sensing device.

14. The method as recited in claim 13, wherein the local sensible field is a magnetic field, and the non-inertial sensor in the motion-sensing device is a magnetometer.

15. The method as recited in claim 1, wherein the motion-sensing device is being used by a user to interact with an application being displayed, there are multiple objects in the application being tracked, and said correcting the three relative angular and three relative translational motions of the motion-sensing device is achieved by combining constraints from the multiple trackable objects.

16. The method as recited in claim 15, wherein there is another motion-sensing device, at least two of the multiple trackable objects are being tracked by the two motion-sensing devices, one of the constraints being a relationship between two respective references for the two motion-sensing devices, wherein the relationship is being built up over time as the user continues to interact with the application.

17. A computing device for determining tracking a motion-sensing device in six degrees of freedom, the computing device comprising:
a transceiver receiving sensor data sequentially from inertial sensors in the motion-sensing device;
a memory space;
a processor coupled to the memory space; and
a data processing unit, coupled to the memory space and controlled by the processor, configured to perform operations of:
estimating three relative angular and three relative translational motions of the motion-sensing device from the sensor data; and
correcting the three relative angular and three relative translational motions of the motion-sensing device to derive a relative motion path of the motion-sensing device, wherein said correcting the relative three angular and three translational motions of the motion-sensing device comprises
detecting when any of the sensor data has been maxed out because of the motion-sensing device being moved beyond limits of the inertial sensors;
estimating overflow values for a portion of the sensor data that has been maxed out; and
replacing the portion of the sensor data that has been maxed out with the overflow values.

18. The computing device as recited in claim 17, wherein the operations further include:
detecting when the motion-sensing device has been moved with reference to a threshold; and
adjusting the threshold to lower a predefined sensitivity so that a movement of the motion-sensing device is detectable.

19. The computing device as recited in claim 18, wherein the operations further include:
maintaining a recent history of all movements of the motion-sensing device in the memory space;
initiating to track the motion-sensing device when a motion of the motion-sensing device is detected exceeding the adjusted threshold; and
including retroactively a part of the history in an initial moment of tracking the motion-sensing device; or
removing retroactively a part of the history from quiescence of the motion-sensing device being detected.

20. The computing device as recited in claim 18, wherein the operations further include:
    storing a beginning portion of the sensor data in the memory space when a motion from the beginning portion of the sensor data is not detected in reference to the threshold; and
    fitting the beginning portion of the sensor data retroactively to a remaining portion of the sensor data after a motion from the remaining portion of the sensor data is detected in reference to the threshold.

21. The computing device as recited in claim 17, wherein the operations further include:
    determining a function that is closely represents a portion of the sensor data has been not maxed out; and
    extrapolating the overflow values from the function.

22. The computing device as recited in claim 17, wherein the operations further include extrapolating new values that correspond to the portion of the sensor data that has been maxed out to make the inertial sensors in the motion-sensing device to have a greater dynamic range.

23. The computing device as recited in claim 17, wherein the operations further include:
    detecting a stop, where an abrupt direction changes in a movement in the sensor data; and
    concatenating two motions before and after the stop to recover the movement of the motion-sensing device.

24. The computing device as recited in claim 17, wherein the operations further include:
    receiving signals from a secondary source monitoring the motion-sensing device when the sensor data is produced from the motion-sensing device,
    determining coordinates of the three relative angular and three relative translational motions of the motion-sensing device with the signals from the secondary source; and
    determining three absolute angular and three absolute translational motions of the motion-sensing device to derive a complete motion tracking of the motion-sensing device.

25. The computing device as recited in claim 24, wherein the secondary source is at least one camera, and the signals are image data, and the operations further include:
    determining consecutive points in a three-dimensional space representing the three relative angular motions and three relative translational motions of the motion-sensing device; and
    determining consecutive points in a two-dimensional space from the image data, these consecutive points in the two-dimensional space corresponding to the consecutive points in the three-dimensional space.

26. The computing device as recited in claim 25, wherein the operations further include:
    determining a difference in yaw between the three-dimensional space and the two-dimensional space; and
    estimating a depth of each of the consecutive points in the two-dimensional space, resulting in a set of consecutive points in a three-dimensional space determined by the camera.

27. The computing device as recited in claim 26, wherein the operations further include: synthesizing a new set of consecutive points that incorporate much less error than the consecutive points in the three-dimensional space, and the consecutive points in the two-dimensional space.

28. The computing device as recited in claim 17, wherein one part of the sensor data is from inertial sensors in the motion-sensing device, and the secondary source generates a local sensible field, another part of the sensor data is from a non-inertial sensor in the motion-sensing device to sense the local sensible field to facilitate determination of the three relative angular and three relative translational motions of the motion-sensing device.

29. The computing device as recited in claim 18, wherein the local sensible field is a magnetic field, and the non-inertial sensor in the motion-sensing device is a magnetometer.

30. The computing device as recited in claim 17, wherein the motion-sensing device is being used by a user to interact with an application being displayed, there are multiple objects in the application being tracked, and said correcting the three relative angular and three relative translational motions of the motion-sensing device is achieved by combining constraints from the multiple trackable objects.

31. The computing device as recited in claim 30, wherein there is another motion-sensing device, at least two of the multiple trackable objects are being tracked by the two motion-sensing devices, one of the constraints being a relationship between two respective references for the two motion-sensing devices, wherein the relationship is being built up over time as the user continues to interact with the application.

32. A motion-sensing device being tracked in six degrees of freedom, the motion-sensing device comprising:
    a set of inertial sensors that generate a first set of sensor data when the motion-sensing device is being manipulated by a user to interact with an application; and
    a transceiver to transport the first set of sensor data to a computing device that is configured to derive a relative moving path in 6 axes including three relative angular and three translational motions of the motion-sensing device, wherein the three relative angular and three relative translational motions of the motion-sensing device are corrected to derive a relative motion path of the motion-sensing device by:
        detecting when any of the sensor data has been maxed out because of the motion-sensing device being moved beyond limits of the inertial sensors;
        estimating overflow values for a portion of the sensor data that has been maxed out; and
        replacing the portion of the sensor data that has been maxed out with the overflow values.

33. The motion-sensing device as recited in claim 32, further comprising at least a non-inertial sensor that produces a second set of sensor data that is also transported via the transceiver therein and used to get at least one of the 6 axes as a known parameter so that less than the 6 axes need to be computed by the computing device from the first set of sensor data.

34. The motion-sensing device as recited in claim 33, wherein the non-inertial sensor produces the second set of sensor data when the motion-sensing device is being moved in a sensible field.

35. The motion-sensing device as recited in claim 34, wherein the local sensible field is a magnetic field, and the non-inertial sensor in the motion-sensing device is a magnetometer.

36. The motion-sensing device as recited in claim 32, wherein the motion-sensing device carries at least a mark, a camera producing a sequence of images capturing movements of the mark to facilitate the computing device to determine an absolute motion tracking of the motion-sensing device from the first set of sensor data together with the image data.

37. The motion-sensing device as recited in claim 36, wherein the camera is disposed around a user holding the motion-sensing device.

\* \* \* \* \*